Patented July 26, 1949

2,477,541

UNITED STATES PATENT OFFICE 2,477,541

PROCESS OF PREPARING A CONCENTRATE FOR TREATING PEPTIC ULCER

Andrew Conway Ivy and Harry Greengard, Chicago, Ill., assignors, by mesne assignments, to Research Corporation, New York, N. Y., a corporation of New York No Drawing. Application July 29, 1943, Serial No. 496,662

8 Claims. (Cl. 167—74)

This invention relates to a physiologically active material and method of preparing the same. More particularly, it relates to a non-toxic concentrate of an active principle secreted by animal bodies and to a method of preparing this concentrate.

Research work performed by the present inventors has revealed that the mucosa of the upper intestines elaborate a principle, the action of which is an inhibition of the motor and secretory activity of the stomach. This hormone has been given the name enterogastrone. It is not known whether enterogastrone is a single substance or a mixture of several substances functioning cooperatively or independently. Whether the single substance or mixture of several substances elaborated by the intestinal mucosa and having the properties referred to above remain unchanged in chemical composition during the purification procedure by which a non-toxic preparation exhibiting the activity referred to above to a high degree is prepared is also unknown. It will be understood, therefore, that where the hormone or an active principle called enterogastrone is referred to throughout this specification and claims it does not necessarily mean a single substance, but instead means the substance or mixture of substances or the derivative or derivatives of such substance or substances which remain in association during the concentration procedure described hereinafter and give the final preparation the characteristics hereinafter described more fully.

It was recognized that the above-mentioned effect of enterogastrone is a highly beneficial one in disorders of the gastro-intestinal tract, particularly in peptic ulcer, including duodenal ulcer, gastric ulcer, and marginal gastrojejunal ulcer following gastroenterostomy. Peptic ulcer, for example, is characteristically accompanied by increased motor and secretory activity of the stomach, which aggravate both the disease process and the symptoms referrable thereto. Thus, a non-toxic, physiologically active principle which tends to counteract such activity of the stomach should be of value in the treatment of peptic ulcer. Experiments on dogs suffering from peptic ulcer have borne out the validity of this assumption. These experiments, furthermore, developed the fact that the enterogastrone therapy need only be continued for a period of six months to a year, at the end of which time it may be discontinued without immediate recurrence of the ulcer. Other materials have been found effective in the therapy of peptic ulcer, whose salutary effect is limited to the duration of the treatment, and interruption of such therapy is followed by a recurrence. Enterogastrone is the only therapeutic agent described which exhibits an inhibitory effect on the ulcerous state following an adequate period of treatment.

In addition to the effects noted above, the dog experiments have developed the fact that enterogastrone possesses still other properties. Among these is the ability to reduce or prevent spasms of the gastro-intestinal tract.

Enterogastrone, as indicated above, is found in the upper intestinal mucosa of animals. In the animal bodies it is associated with numerous other substances, some of which are inert and others of which are toxic. The separation of the active principle in a sufficiently concentrated form and free from toxic material has proven very difficult. Thus the extract used in the early dog experiments, while showing the activity of the principle, was known to be impure and to produce refractoriness in a substantial number of the dogs treated and was not at all suitable for administration to humans because of its toxicity.

It is an object of the present invention to provide a non-toxic preparation exhibiting to a high degree the physiological activity characteristic of enterogastrone.

A further object is to provide a non-toxic preparation exhibiting to a high degree the ability to depress the secretory activity of the stomach.

Another object is to provide a non-toxic preparation exhibiting to a high degree the ability to heal peptic ulcer.

Another object is to provide a non-toxic preparation exhibiting to a high degree the ability to inhibit the occurrence of peptic ulcer.

Still another object is to provide a physiologically active preparation derived from a source of material elaborated by the upper intestines of animals, said preparation being non-toxic, non-irritating and suitable for administration to humans and including a high concentration of material giving the preparation the ability to depress the secretory activity of the stomach, and to heal and inhibit the recurrence of peptic ulcer.

A further object is to provide a physiologically active preparation derived from a source of material elaborated by the upper intestines of animals, said preparation being non-toxic, non-irritating and suitable for administration to humans and including a high concentration of material giving the preparation the ability to depress the secretory activity of the stomach, to depress spasms in the gastro-intestinal tract, and to heal and inhibit the recurrence of peptic ulcer.

A still further object is to provide a method of deriving from a source of material elaborated from the upper intestines of animals a physiologically active preparation which is non-toxic, non-irritating and suitable for administration to humans and includes a high concentration of material giving the preparation the ability to depress the secretory activity of the stomach and to heal and inhibit the recurrence of peptic ulcer.

Still another object is to provide a method of preparing from the upper intestinal mucosa of animals a physiologically active preparation which is non-toxic, non-irritating and suitable for administration to humans and includes a high concentration of material giving the preparation the ability to depress the secretory activity of the stomach and to heal and inhibit the recurring of peptic ulcer.

Other objects will appear hereinafter.

It has now been found that these objects are accomplished by a procedure in which an extract of the active principle is first prepared from a material obtained from animal bodies, for example, from the upper intestines. The upper intestine, preferably after it has been washed and everted, is extracted with a dilute aqueous acid solution, for example, with 0.4% hydrochloric acid for about half an hour. A precipitate including enterogastrone is then salted out of the extract, for example, by saturating with sodium chloride. This precipitate is separated by any desired means, such as filtration or centrifugation and preferably after washing is suspended in water and the pH is adjusted to approximately the isoelectric point, for example, by the addition of alkali, and the undissolved solid material is separated, for example, by boiling and then filtering or centrifuging. The isoelectric point is determined potentiometrically and is the pH at which a flat point occurs during titration. It has been found to be about pH 5.4.

A protein precipitant, for example, an aqueous solution of tannic acid, preferably a saturated solution, is added to the resulting filtrate and the precipitate so formed is separated by suitable means such as filtration or centrifuging. Preferably the protein precipitant is added in an amount such that further additions will not produce any additional precipitate. This precipitate, preferably after washing, is decomposed by trituration with an acidified aqueous solution of a water-miscible ketone or alcohol, for example, aqueous acetone containing about 70% acetone and a small amount of hydrochloric acid. The resulting solution, preferably after separating any undissolved material, is then mixed with a relatively large volume of the water-miscible ketone or alcohol, for example, with 6 volumes of acetone, whereupon further precipitation takes place. This precipitate is white and after it has been isolated by suitable means, such as centrifuging or filtering and preferably washed, for example, with acidified methyl alcohol and with acetone, is redissolved in water.

Picric acid or a related nitrated phenol derivative, for example, a solution of picric acid in acetone, preferably a satuated solution, is added to this solution and the precipitate so formed is separated by suitable means, for example, in the manner described above. Preferably, the picric acid or related derivative is added in an amount such that further additions will not produce any additional precipitate. This precipitate, preferably after washing with water, is triturated as described above, for example, with the acidified 70% aqueous acetone. This solution, preferably after separating any undissolved material, is also mixed with a large volume of the water-miscible ketone or alcohol, preferably a considerably larger volume than that used previously, for example, with 10 volumes of acetone. Another precipitate is obtained which is separated by suitable means as repeatedly described. It is preferably washed, for example, with acetone, and dried.

The dried precipitate is a white water-soluble powder containing the active principle, enterogastrone, in concentrated form. It is free of toxic material and largely or completely free of inert material, and is thus suitable for administration to humans in the treatment of disorders of the gastro-intestinal tract or for other purposes.

While the product of the above-described procedure is, as noted, sufficiently pure for administration to humans, it may be still further purified by further treatment. This further treatment, however, results in some loss of active material which is not for most purposes compensated by the increase in purity which results.

In one procedure the precipitate last mentioned above, preferably after washing with acetone as described, is redissolved in water. An aromatic amine, for example, aniline, is then added. Preferably, as in the case of the other precipitants described above, the aromatic amine is added in an amount such that further additions will not produce any additional precipitate. This precipitate is separated by suitable means as set forth above and the filtrate is mixed with a large volume of a water-miscible ketone or alcohol, preferably of the same order as that last referred to above, for example, with 10 volumes of acetone, whereupon another precipitate is formed which is likewise separated by suitable means as described above and preferably is washed with acetone and ether and dried. This product is, like that described above, a white water-soluble powder containing the active principle, enterogastrone, in concentrated form and suitable for administration to humans. It exhibits a slightly increased purity as compared with the product described above, however.

Instead of the aromatic amine treatment, a treatment with picrolonic acid may be given. In accordance with this procedure the solution to which the aromatic amine is added, as described above, is prepared, but picrolonic acid is added instead of the aromatic amine, for example, a solution of picrolonic acid in acetone, preferably a saturated solution, is added. The quantity of picrolonic acid added, as in the case of the other precipitants mentioned above, is preferably an amount such that further additions will not produce any additional precipitate. This precipitate is separated by suitable means as previously indicated and is preferably dried in air, and then recrystallized from pyridine by precipitation with ether. This product is also a white water-soluble powder containing the active principle, enterogastrone, in concentrated form and suitable for administration to humans and also otherwise generally similar to the white water-soluble powder first described above, except that it is of slightly greater purity and is a relatively pure crystalline picrolonic acid salt of the active principle.

In order that the invention may be better understood, the following detailed examples are given. These examples, which describe fully procedures for preparing an enterogastrone concentrate suitable for administration to humans are, however, intended to be construed as illustrative only and not as limiting the scope of the invention.

Example I

Immediately after killing, the upper intestines of hogs were washed, everted and extracted with 0.4% hydrochloric acid for half an hour. This extract was saturated with sodium chloride and the resulting precipitate recovered by filtration.

This precipitate, after washing with 0.4% hydrochloric acid solution saturated with sodium chloride, was suspended in water. The pH of this suspension was then adjusted to pH 5.4 by the addition of dilute aqueous sodium hydroxide and the suspension was then boiled and filtered. A saturated aqueous solution of tannic acid was then added slowly to the filtrate until further additions did not produce any additional precipitation. The resulting precipitate was collected by filtration and was then washed, first with distilled water, then with 5% acetic acid, and again with distilled water.

The washed precipitate was decomposed by trituration with acidified aqueous acetone prepared by adding 1 part by volume of 36% (by weight) hydrochloric acid to a mixture of 70 parts by volume of acetone and 30 parts by volume of water. The solution which resulted, after separating any undissolved material, was then mixed with 6 volumes of acetone and the resulting white precipitate was isolated by filtration. It was first washed with acidified methyl alcohol prepared by adding 1 part by volume of 36%, by weight, hydrochloric acid to 100 parts by volume of methyl alcohol. The precipitate was then washed with acetone.

The washed precipitate was redissolved in water and a saturated solution of picric acid in acetone was then added to the solution of the precipitate until further additions of the picric acid produced no further precipitation. This precipitate, after separation by filtration, was washed with water and was then triturated with acidified aqueous acetone of the composition described above and still another precipitate was thrown down by mixing the solution resulting from the trituration, after separating any undissolved material, with 10 volumes of acetone. After separation by filtration, this last precipitate was washed with acetone.

This acetone-washed precipitate, which is of sufficient purity to render it suitable for administration to humans, is the preferred final product, and is preferably dried and stored for use. However, in order to still further increase the purity, the precipitate was redissolved in water and aniline was then added until further additions of aniline produced no further precipitation. The resulting precipitate was separated by filtration and discarded and the filtrate was mixed with 10 volumes of acetone. The resulting precipitate was recovered by filtration, washed with acetone and ether, and then dried. The product was a white water-soluble powder suitable for administration to humans for the treatment of disorders of the gastro-intestinal tract and differing from the product prior to the aniline treatment only in that it was of slightly higher purity. Both products are non-toxic and exhibit a high degree of enterogastrone activity.

Example II

The extraction and purification of the enterogastrone was carried out exactly as described in Example I to the point where aniline was added. Instead of adding aniline, however, a saturated solution of picrolonic acid in acetone was added until further additions produced no further precipitation. This precipitate, after recovery by filtration, was dried in air and then recrystallized from pyridine by precipitating with ether. This precipitate had the same properties and uses as before the picrolonic acid treatment with the exception that it was of slightly greater purity and is known to be a relatively pure crystalline picrolonic acid salt of the active principle.

As has already been indicated, the invention is not limited to the detailed procedures described above nor to the source material particularly referred to in the examples. By way of further illustration, it is pointed out that while the upper intestines are the preferred source of raw material, since it is in the mucosa of these intestines that the enterogastrone is elaborated, it is within the scope of the present invention to obtain the physiologically active material from any source. Thus, instead of obtaining the active material from the intestines it may be obtained from other sources of material elaborated by these upper intestines, that is, from any part of the animal body with which the active material elaborated by the intestines may be found associated or from any material produced by the animal body which contains such active material, for example, from urine. Similarly, although hog intestines are the source material most commonly used because of their availability, intestines of other species may also serve as a source of the active principle, for example, the active principle may be obtained from the intestines of cattle, sheep, horses, etc., or from human autopsy material.

While it is definitely preferred that hydrochloric acid be employed in all the various stages of the process where its use is indicated in the above examples, it will be understood that the invention is not limited to the use of hydrochloric acid and that it may be replaced in any one or more of the various stages by any mineral acid, such as hydrobromic acid, hydriodic acid, sulphuric acid, nitric acid or phosphoric acid, or by certain organic acids, such as acetic acid, lactic acid, pyruvic acid or by mixtures of any two or more of the foregoing acids. When the hydrochloric acid is replaced with another acid it is preferable that the quantity of such other acid added shall be about that which will give an acid medium of the same strength as that produced by the quantities of hydrochloric acid indicated in the above examples. Thus the actual weight or volume of the acid medium added may vary considerably due not only to differences in molecular weights of the various acids, but also to differences in their extent of ionization or strength. While, as indicated, it is not necessary to adhere rigidly to the acid strength indicated by the quantities of hydrochloric acid employed in the above examples so that moderate variations are within the scope of the invention, it should be understood that variations from the acid strength indicated tend towards the production of inferior results, particularly in the extraction step, so that susbtantial variations are not preferred.

Referring now particularly to the extraction step, it is pointed out that 0.4% hydrochloric acid for half an hour has been found to give the optimum extraction which is a maximum of the active principle with a minimum of impurities. If these conditions are varied, however, it should be borne in mind that the acid strength and time of extraction are interdependent so that with acid of lesser strength than that specified the optimum extraction at that acid strength will generally require somewhat more than half an hour and vice versa when the acid strength is greater than that specified. The salt with which the original extract is saturated is preferably sodium chloride. It may, however, be replaced with any equivalent salt. The various precipitates which are formed can be separated in any desired manner, as indicated, the method used being determined generally by convenience. These precipitates are preferably washed as described for the usual purpose of increasing the purity of the precipitate. Loss of the precipitate during washing is preferably minimized by employing a washing medium of appropriate character.

The adjustment of the pH following suspension in water of the precipitate thrown out of the initial extract by salt is preferably carried out carefully so as to bring the medium exactly to the isoelectric point, that is, pH 5.4. Some variation from this is permissible within the scope of the invention, for example, satisfactory results are obtained where the pH is adjusted to any pH between about pH 5.2 and about pH 5.6. The inferiority of results increases very rapidly, however, outside the range specified as compared with the extent to which the pH varies from that of the isoelectric point. The alkali employed in adjusting the pH to the isoelectric point need not necessarily be sodium hydroxide, although this reagent is preferred. Equivalent alkalis may be used in place of sodium hydroxide, but the alkali is preferably added in the form of an aqueous solution which may be of any desired strength. The boiling of the suspension is for the usual purpose of breaking the suspension and improving the ease with which the suspended solids are separated.

In the step of the process in which tannic acid is specified in the above examples its use is definitely preferred. It may be replaced, however, if desired, by other protein precipitants such as tungstic acid, trichloracetic acid or phosphomolybdic acid. Whether the acid employed be tannic acid or some other protein precipitant, it is preferably added in the form of a saturated aqueous solution, although this is not essential.

As is true of other reagents and conditions specified in the examples, the use of acetone as described therein is preferred. Acetone may be replaced, however, at any of the various stages in the process where it is used by any water-miscible ketone or alcohol. The proportions of acetone employed are preferred, although moderate variations are within the scope of the invention. Excessive variations, however, will lead to inferior results where acetone is employed in view of the solubility characteristics of the active material in aqueous acetone. Where the acetone is replaced with another reagent, however, some change in proportions will generally be preferred.

In the step where picric acid is used, as set forth above, it may be replaced by related nitrated phenol derivative, such as picrolonic or flavianic acids. Picric acid is preferred, however, and it is also preferable, although not essential, that the picric acid or related nitrated phenol derivative be added in the form of a saturated solution.

In the optional step described above where aniline is added the aniline can be replaced by any aromatic amine, for example, pyridine or methyl aniline. Aniline is, however, preferred. In the other optional procedure involving the use of picrolonic acid, this reagent is preferably but not necessarily added in the form of a saturated solution and other recrystallization procedures or equivalent purification steps may be substituted for the recrystallization from pyridine, the object of which is, of course, to further purify the concentrate. The enterogastrone concentrate, freed of toxic material and substantially freed of inert material, whether it be that obtained without the optional treatments with the aromatic amine or with picrolonic acid, or whether it be the more highly purified product, is preferably finished in the form of a dry powder where it is to be retained for any substantial period of time, although it is preferably dissolved in distilled water prior to use and administered in the form of such a solution.

The solution for administration to humans is prepared by dissolving a weighed amount of the powdered enterogastrone concentrate in a measured amount of triple distilled water (non-pyrogenic). This solution is passed through a sterile Berkefeld filter (porosity N) and bottled in sterile vaccine bottles. Although the enterogastrone concentrate described herein is suitable from the standpoint of purity and other characteristics for administration either orally or parenterally in the treatment of disorders of the gastro-intestinal tract, parenteral administration is employed since it has been found that the enterogastrone is largely or completely without effect, at least in the treatment of peptic ulcer, where it is administered orally. This may be due either to destruction in the gastro-intestinal tract or to failure of absorption, with the former being more probable.

It has been found that the effect of enterogastrone on gastric acidity is a satisfactory criterion of the effectiveness of the enterogastrone in the treatment of peptic ulcer. Determined on this basis, the effect of enterogastrone is noted within 20 minutes following its intravenous administration in the minimum effective dose. Subcutaneous or intramuscular injection prolongs the latent period 60 to 90 minutes.

Both the effectiveness and the lack of toxicity of the concentrate prepared as described herein have been thoroughly demonstrated by animal experiments and to a lesser extent by administration to humans. For example, a preparation of which the effective dose on gastric secretion was about 50 milligrams was administered to anesthetized dogs in gradually increasing doses, beginning with 10 milligrams and continuing until a 200 milligram dose was given. No fall in blood pressure and no alterations in respiration were noted. Also, while 200 milligrams given at once on the first injection produces a drop in blood pressure of 10 to 20 millimeters of mercury, when such an injection is repeated there is no fall in blood pressure and no alteration in respiration is noted in either case. In unanesthetized dogs an intravenous injection of 100 milligrams of the same preparation was without apparent external effect. Occasional animals evidenced a momentary distress in the form of nausea and vomiting or vertigo. No such manifestations were noted in dogs which had been injected several times. A series of 20 Mann-Williamson dogs which received 3 injections daily for a period of time up to a year showed no evidence of ill effects as a result of the injections. Subcutaneous or intramuscular injection of the concentrate in amounts up to 200 milligrams in a dog or in amounts up to 200 milligrams per kilo in a guinea pig failed to evoke any toxic symptoms.

Tests for the production of anaphylaxis were made in a series of 48 normal guinea pigs. These guinea pigs were injected with 50 milligrams of enterogastrone daily for 4 days and then after an interval of 2 to 3 weeks had elapsed half the animals were injected with 100 milligrams. All the guinea pigs survived the procedure and in no case was there evidence of anaphylaxis. The remaining half of the animals were killed, a strip of intestine excised and placed in a bath so that its contractility could be noted. Addition of enterogastrone to the bath failed to cause a contraction of the strip which, however, responded normally to histamine. These experiments demonstrate that the enterogastrone concentrate is without anaphylaxis producing effect.

The potency or activity of enterogastrone concentrates is determined by tests on dogs. The test animals are given a subcutaneous injection of histamine in an amount sufficient to stimulate the gastric glands to secrete 40 to 120 milligrams of HCl in 1½ hours, at the end of which time the histamine effect is no longer operative. The animals are allowed a 1½ to 2 hour rest period, at the end of which the histamine stimulus is repeated, and in animals which are accustomed to the procedure and are in good condition there is little difference between the two responses to histamine.

The activity of a given enterogastrone concentrate is determined by administering a definite quantity to the dog 20 to 30 minutes prior to the second histamine injection. The response to the second histamine injection is then compared to that elicited by the first histamine injection and the extent to which the secretion of HCl is inhibited is noted. The quantity of acid secreted in any instance is determined by withdrawing fluid from the stomach and analyzing it. An arbitrary unit amount of enterogastrone has been defined as that amount which will halve the amount of acid secreted in response to the histamine injection. The dogs are checked periodically at intervals of a week to 10 days in order to ascertain that the two responses to histamine are identical. For this purpose the second histamine injection is preceded by the administration of salt solution and this procedure is termed a blank test.

In addition to establishing as a result of animal tests that the enterogastrone concentrate is free of toxic material, does not produce any anaphylaxis, and in general can be administered over long periods of time without producing any ill effects, it has further been established through dog experiments that the concentrate is valuable in the treatment of disorders of the gastro-intestinal tract, particularly in peptic ulcer.

For this purpose a series of dogs were prepared by the Mann-Williamson operation, which consists of a gastro-jejunostomy with drainage of the pancreatic juice and bile into the distal ileum. This operation produces a jejunal ulcer uniformly in substantially all dogs, which ulcer is analagous to one which occurs frequently in man and which is very difficult to manage therapeutically.

Twenty-five of these dogs were injected intravenously at about 10:00 A. M., 4:00 P. M. and 10:30 P. M. with 50 milligrams of enterogastrone concentrate dissolved in a small quantity of water every day except Sunday, when the animals received only two injections. This enterogastrone concentrate was assayed intermittently by the method described above to insure uniformity. It was found that a dose of 50 milligrams of the concentrate contained approximately 1 unit (see above) of enterogastrone. Ten other dogs prepared by the Mann-Williamson operation were treated with an extract of pork muscle prepared according to the method by which the enterogastrone concentrate was prepared, this pork muscle extract being administered in the same amount and in the same frequency as the enterogastrone concentrate. Assay of this extract showed no inhibition of gastric secretion or motility. In addition, 16 other Mann-Williamson dogs were given the same diet treatment as the 10 dogs treated with pork muscle extract and as the 25 dogs receiving the enterogastrone preparation, with the single exception that they did not receive the pork muscle extract and did not receive the enterogastrone concentrate treatment.

All of the dogs which did not receive the enterogastrone treatment died with ulcer in from 5 to 30 weeks, the average survival time of those receiving the muscle extract being about 16 weeks or approximately the same as that of the 16 dogs which received neither the muscle extract nor the enterogastrone, which was 17 weeks. In contrast to this, of the 25 dogs given the enterogastrone treatment, only 6, or 24%, developed any ulcer at all. Furthermore, the average survival time of these 6 dogs was 27 weeks or almost twice that of the control group. Eight other dogs in the group of 25 died within 9 months without developing any ulcer. That the death of these dogs is without significance so far as the enterogastrone treatment is concerned is evidenced by the fact that previous investigations have shown that such a death rate is generally characteristic of Mann-Williamson dogs. The operation per se is attended by a mortality because adhesions and intra-abdominal hernia occur and cause death from intestinal obstruction or predispose to distemper and pneumonia.

The remaining 11 dogs receiving enterogastrone treatment were still alive at the end of 9 months without developing ulcer, and 7 of the 11 had survived well over a year without developing any ulcer. Seven of the 11 animals at the end of one year of treatment were explored, the jejunal mucosa visualized, and no ulcer was found. The enterogastrone therapy was discontinued. Four of the 7 animals received no therapy for over 4 months and none have developed ulcer. This is remarkable because in a previous study when 10 Mann-Williamson dogs in which ulcer had been prevented for from 9 to 11 months by aluminum phosphate jell were deprived of therapy an ulcer developed in from 5 to 16 weeks. This ability to confer an immunity to the development of peptic ulcer after treatment is discontinued is entirely new, no other material being known which has this property.

The fact that ulcer occurred in 6 of the 25 dogs of course cannot be completely ignored. There are several possible explanations, however. In the first place, it may be too much to expect to prevent ulcer in all Mann-Williamson dogs simply by making three injections of enterogastrone daily when it is realized that the depression of gastric secretion from one injection does not endure longer than two hours. Secondly, the preparation that was injected into the dogs referred to above was not of as high purity as that prepared as described herein and some dogs became refractory. This latter reason may well be the more pertinent one since in support of this latter reason it has been noted that 2 of 8 total pouch dogs used for assay of enterogastrone preparations as described above became refractory within one month, whereas the remaining 6 gave no indications of altered tolerance on receiving repeated injections for periods varying from several months to several years. It is a striking coincidence that 25% of total pouch dogs became refractory to the extract and that 24% of the Mann-Williamson dogs developed ulcer. It was not practicable and feasible to test the Mann-Williamson dogs to determine whether they had become refractory.

Now that an extract has been produced which is sufficiently pure and non-toxic for administration to humans it has been possible to verify the indications as to the effect of the preparation on humans which were obtained by the experiments with dogs, guinea pigs, etc. Thus it has been found that the preparation is non-toxic and non-irritating to humans. In the early stages of the use of this preparation injection in a human subject either by the subcutaneous or by the intramuscular route was attended by slight pain at the site of injection lasting for up to 2 hours and a small area of erythema persisting for 24 hours was observed after subcutaneous injection. It has now been found, however, that by exercising greater care in the injection, both the pain following intramuscular injection and the pain and erythema following subcutaneous injection are eliminated. No systemic effects have been noted in any case.

Enterogastrone therapy has now been given to a number of patients who have been diagnosed as having a peptic ulcer of one form or another. In a number of these cases the ulcer condition is of relatively long standing, although it may have been relieved by one or the other of the previously known treatments, even to the extent where symptoms have subsided or disappeared, but in every case decided improvement in the patient's condition and relief of the distress resulting from the peptic ulcer have been noted. These patients have all reported relief of distress in from 2 to 6 days following the institution of the enterogastrone therapy.

The non-toxic enterogastrone preparation has been administered to the various human patients in doses of 200 milligrams given approximately 3 times weekly. The 200 milligrams of the powdered material are dissolved in a small quantity of water and injected either subcutaneously or intravenously. It may be put up in the form of a weighed amount of dry powder in a vial, to be dissolved in an appropriate medium just prior to injection.

As has been suggested above, it has not been possible to date to determine the chemical composition of enterogastrone. A sufficient number of the characteristics and properties of enterogastrone have been determined, however, to make possible adequate identification of preparations containing the active material. For example, it has been found that the test described above by which the potency of enterogastrone preparations is determined, that is, that involving successive injections of histamine into dogs with an injection of the material to be tested for the presence of enterogastrone preceding the second histamine injection, is a very satisfactory means of identifying enterogastrone, since the material adapted to depress spasms, heal peptic ulcer and inhibit the occurrence of peptic ulcer is the same as or during purification remains with the material which depresses secretory activity of the stomach. In fact, this test was used as a guide in working out the purification procedures described herein.

This is not the only characteristic by which the enterogastrone-containing material may be identified, however. Thus, enterogastrone-containing material has been found to be soluble not only in water, but also in dilute acids and dilute alkalis. It is stable to a half hours' boiling. It is soluble in acetone-water mixtures up to a concentration of about 70% acetone, but as the acetone concentration is increased above 70% the solubility decreases until at 100% acetone concentration the material is completely insoluble. It has been shown by analysis that the product prepared as described in Example I either with or without the aniline treatment contains about 15% by weight of nitrogen and less than about 0.2% by weight of ash, and is substantially free of protein material. This product has also been found to have an apparent molecular weight of about 470 as determined by the freezing point method. The active principle as distinguished from compounds thereof exhibiting enterogastrone activity has also been definitely identified as an organic nitrogen base, capable of forming crystalline salts with acids, such as the picrolonate prepared as described in Example II.

The advantages of the invention will be apparent from the foregoing description. For the first time a material is provided which is not only capable of relieving the distress and symptoms characteristic of peptic ulcer, but which is also capable of inhibiting the recurrence of the ulcer even if administration of the extract is discontinued following its administration for a substantial period of time. It has been found, for example, that after enterogastrone has been given for from six months to a year, it may be discontinued without recurrence of the ulcer. Although no time limit on the continuance of this inhibitory effect has been noted to date, it cannot be demonstrated that it is permanent except by the passage of time. It has been shown, however, that it continues for a very substantial period. This inhibition of recurrence of the ulcer has been noted even where the conditions which originally caused the ulcer continue to exist after termination of the treatment with the enterogastrone-containing material. The property of inhibiting the occurrence of peptic ulcer, that is, hindering its recurrence even after therapy is discontinued, is unique to enterogastrone as indicated above and is highly important.

In addition to its other properties, enterogastrone has also been found to have the ability to depress spasms in the gastro-intestinal tract. The material has been shown to be non-toxic and it has also been found that there is no danger of overdosage.

In addition to the characteristics particularly set forth above, it is also evident that the enterogastrone has a highly beneficial effect in the treatment of disorders in general of the gastro-intestinal tract. This has already been indicated by investigational work, the results of which to date suggest that the enterogastrone preparations described herein have valuable properties in addition to those set forth above.

It is apparent that many widely different embodiments of this invention may be made without departing from the spirit and scope thereof and therefore it is not intended to be limited except as indicated in the appended claims.

What we claim is:

1. A method of making a non-toxic, non-irritating parenterally effective, physiologically active preparation suitable for administration to humans and including a high concentration of material exhibiting the ability to depress the secretory activity of the stomach, which includes the steps of extracting material from the upper intestine of mammals with a dilute aqueous solution of an acid, salting out a precipitate from the solution with a salt, separating the precipitate thus formed and suspending it in water, adjusting the pH of the suspension to approximately the isoelectric point, then separating undissolved material from the suspension, adding a protein precipitant to the remaining solution, separating the protein precipitate, treating the protein precipitate with an aqueous solution of a water-miscible compound selected from the group consisting of water-miscible alcohols and ketones to dissolve material therein containing the active principle, said water-miscible alcohols and ketones being anti-solvents for the desired active principle, increasing the proportion of the anti-solvent in the solution to form a precipitate containing the active principle, separating the precipitate thus formed, dissolving this precipitate in water, adding a nitrated phenol derivative in solution in an anti-solvent for the active principle to form a precipitate containing the active principle, separating the precipitate thus formed, treating the precipitate with an aqueous solution of one of said anti-solvents to dissolve material therein containing the active principle, separating undissolved matter from the solution, increasing the proportion of the anti-solvent in the solution to form a precipitate, and separating this last named precipitate.

2. A method as described in claim 1 further characterized in that the acid in the aqueous solution in the step of extracting material from the upper intestine is hydrochloric acid.

3. A method as described in claim 1 further characterized in that the salt in the salting-out step is sodium chloride.

4. A method as described in claim 1 further characterized in that the protein precipitant is tannic acid.

5. A method as described in claim 1 further characterized in that the anti-solvent for the actine principle is acetone.

6. A method as described in claim 1 further characterized in that the nitrated phenol derivative is picric acid.

7. A method of making a non-toxic, non-irritating, parenterally effective, physiologically active preparation, suitable for administration to humans and including a high concentration of material exhibiting the ability to depress the secretory activity of the stomach, from an aqueous solution of a precipitate obtained by salting out of a dilute acid solution material elaborated in the upper intestines of mammals and including the active principle, suspending in water the precipitate salted out, adjusting the pH of the suspension to approximately the isoelectric point, separating the undissolved solid material, adding a protein precipitant to the remaining solution, treating the protein precipitate with an aqueous solution of an anti-solvent for the active principle selected from the group consisting of water-miscible alcohols and ketones to dissolve material therein containing the active principle and then precipitating said last named material by adding further quantities of said anti-solvent, which comprises adding a nitrated phenol derivative in solution in an anti-solvent for the active principle to said first named aqueous solution to form a precipitate containing the active principle, separating the precipitate thus formed, treating this precipitate with an aqueous solution of one of said anti-solvents to dissolve material therein containing the active principle, separating undissolved matter from the solution, then precipitating material containing the active principle by adding further quantities of said anti-solvent and separating the precipitate which results.

8. A method of making a non-toxic, non-irritating, parenterally effective, physiologically active preparation, suitable for administration to humans and including a high concentration of material exhibiting the ability to depress the secretory activity of the stomach, from an aqueous solution of a precipitate obtained by salting out of a dilute hydrochloric solution material elaborated in the upper intestines of mammals and including the active principle, suspending in water the precipitate salted out, adjusting the pH of the suspension to approximately the isoelectric point, separating the undissolved solid material, adding tannic acid to the remaining solution to precipitate material containing the active principle, treating the tannic acid precipitate with an acidified aqueous acetone solution to dissolve material in the tannic acid precipitate containing the active principle and then precipitating said last named material by adding further quantities of acetone, which comprises adding a solution of picric acid in acetone to said first named aqueous solution to form a precipitate containing the active principle, separating the precipitate thus formed, treating this precipitate with an acidified aqueous acetone solution to dissolve material therein containing the active principle, separating undissolved matter from the solution, then precipitating material containing the active principle by adding further quantities of acetone and separating the precipitate which results.

ANDREW C. IVY.
HARRY GREENGARD.

REFERENCES CITED

The following references are of record in the file of this patent:

UNITED STATES PATENTS

| Number | Name | Date |
| --- | --- | --- |
| 2,292,841 | Necheles | Aug. 11, 1942 |

OTHER REFERENCES

Gray et al.: "On the preparation and biological assay of enterogasterone," Am. J. Physiology, 118 (1937), pages 463 to 465.

J. A. M. A., Aug. 28, 1926, pages 640 to 645. (Copies of above in Division 43.)

Endocrinology, June 1942, pages 905 to 911; article by Hands et al. (Copy in Pat. Off. Scientific Library.)